INVENTOR.
ERIC B. SVENSON
BY
ATTORNEY

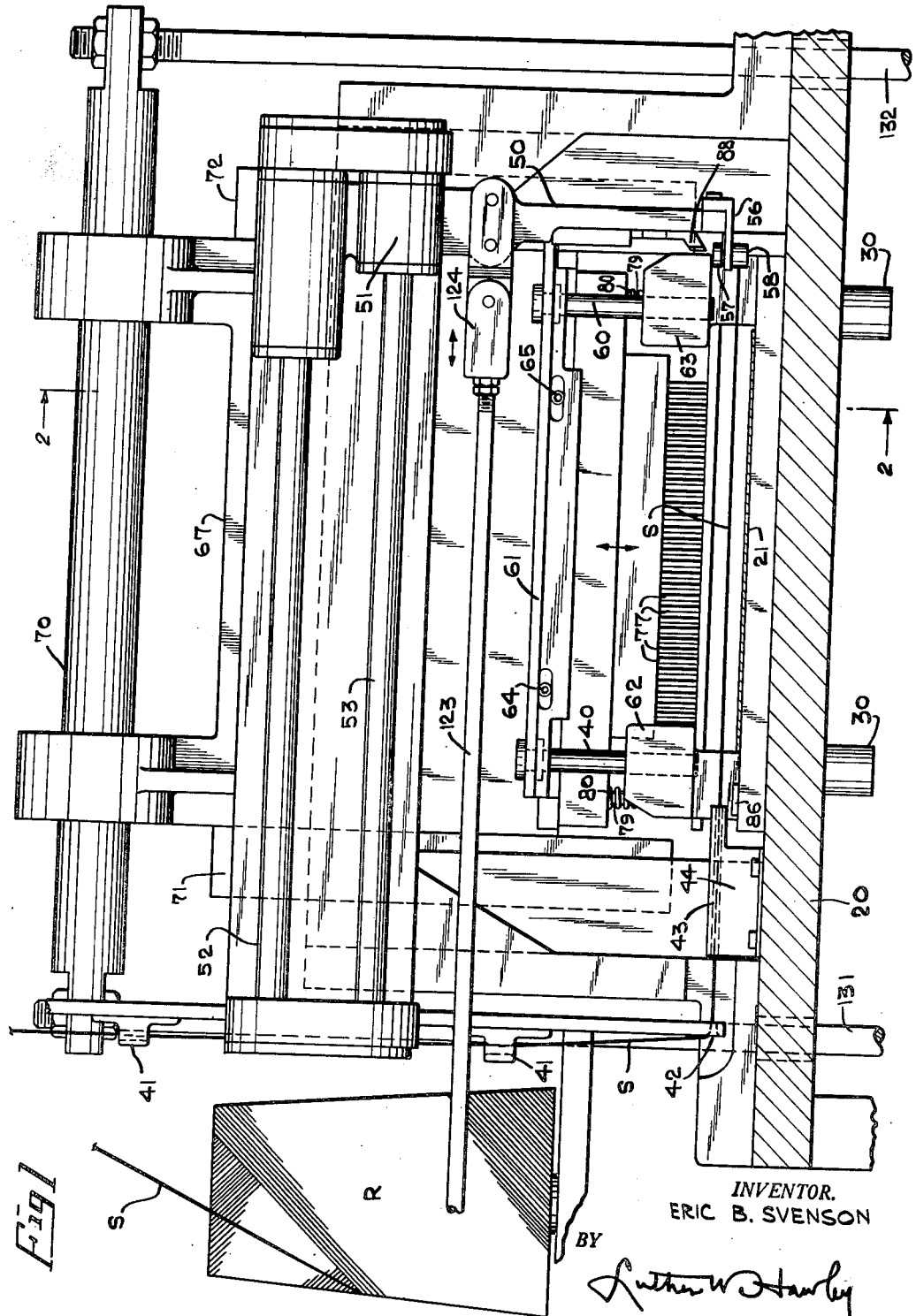

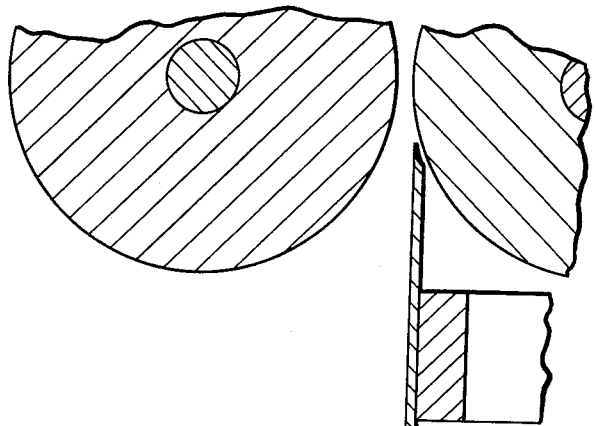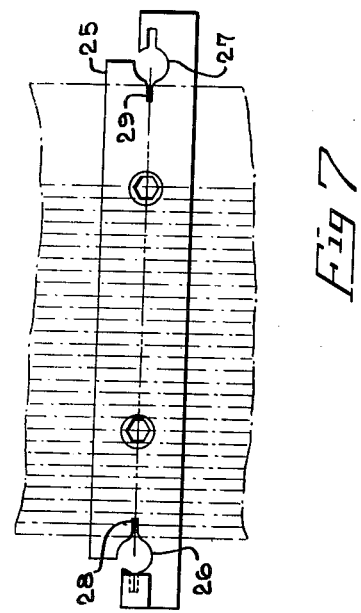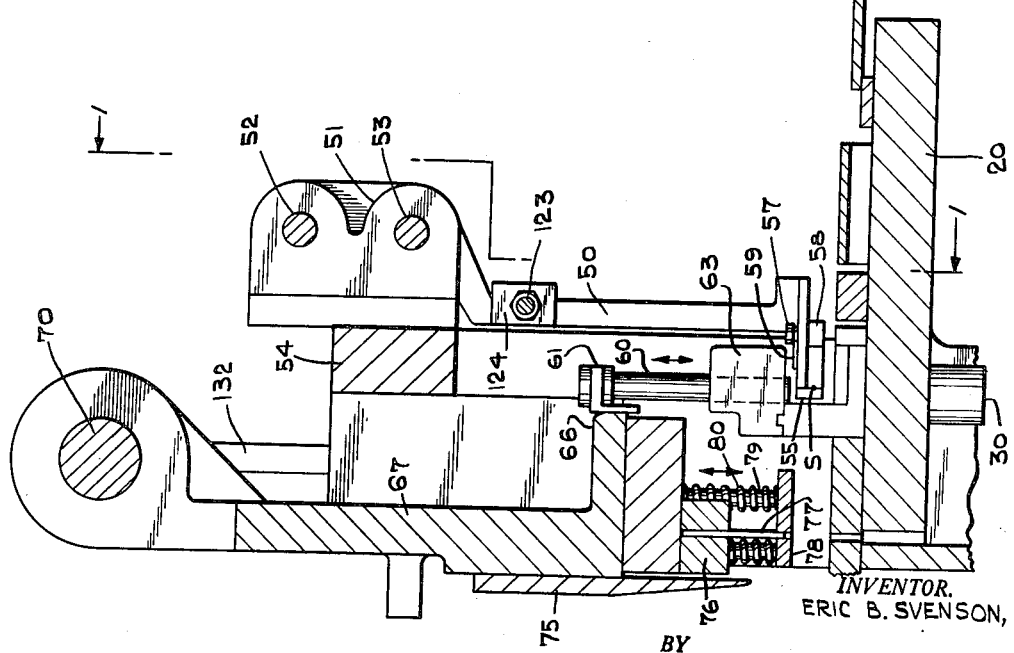

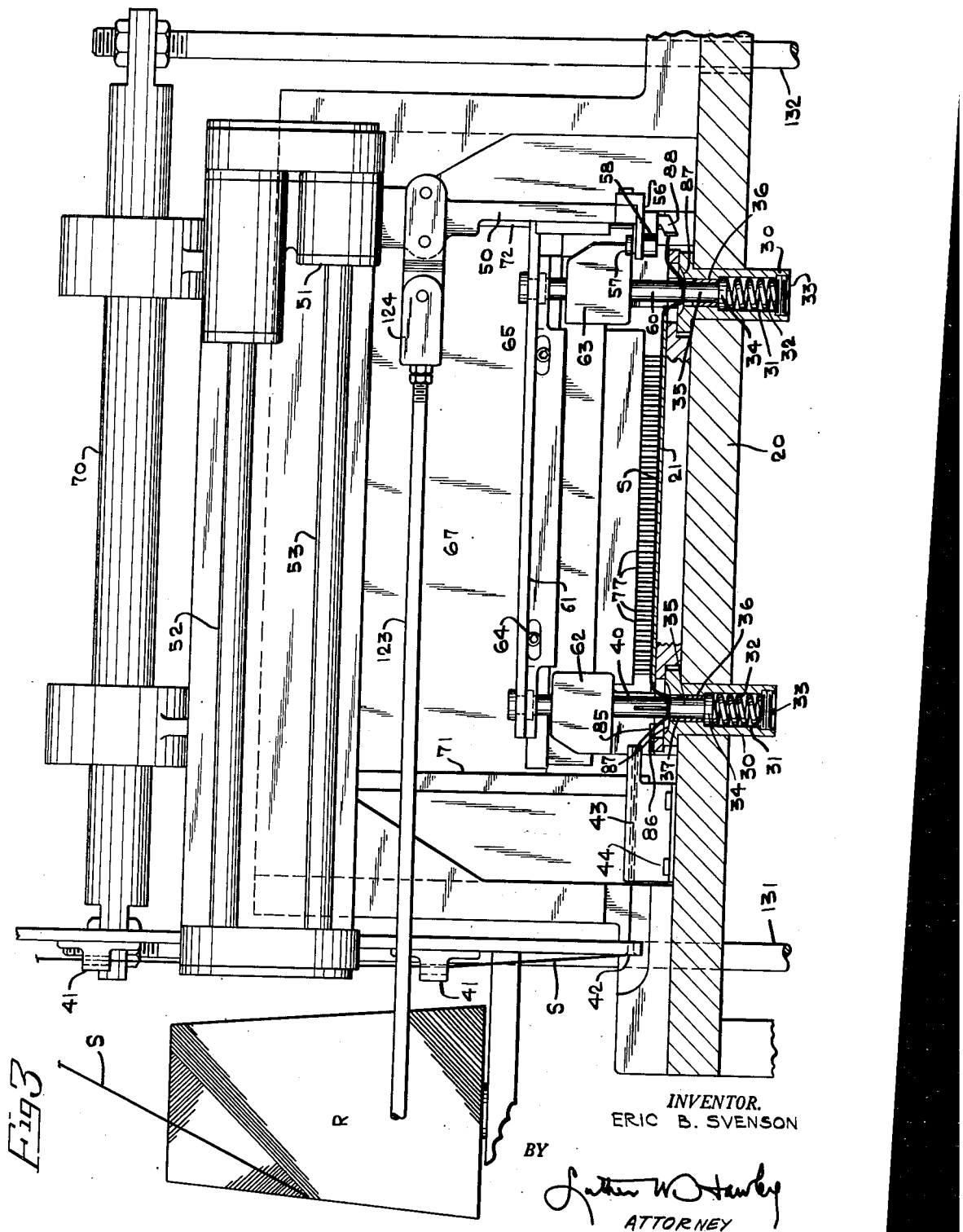

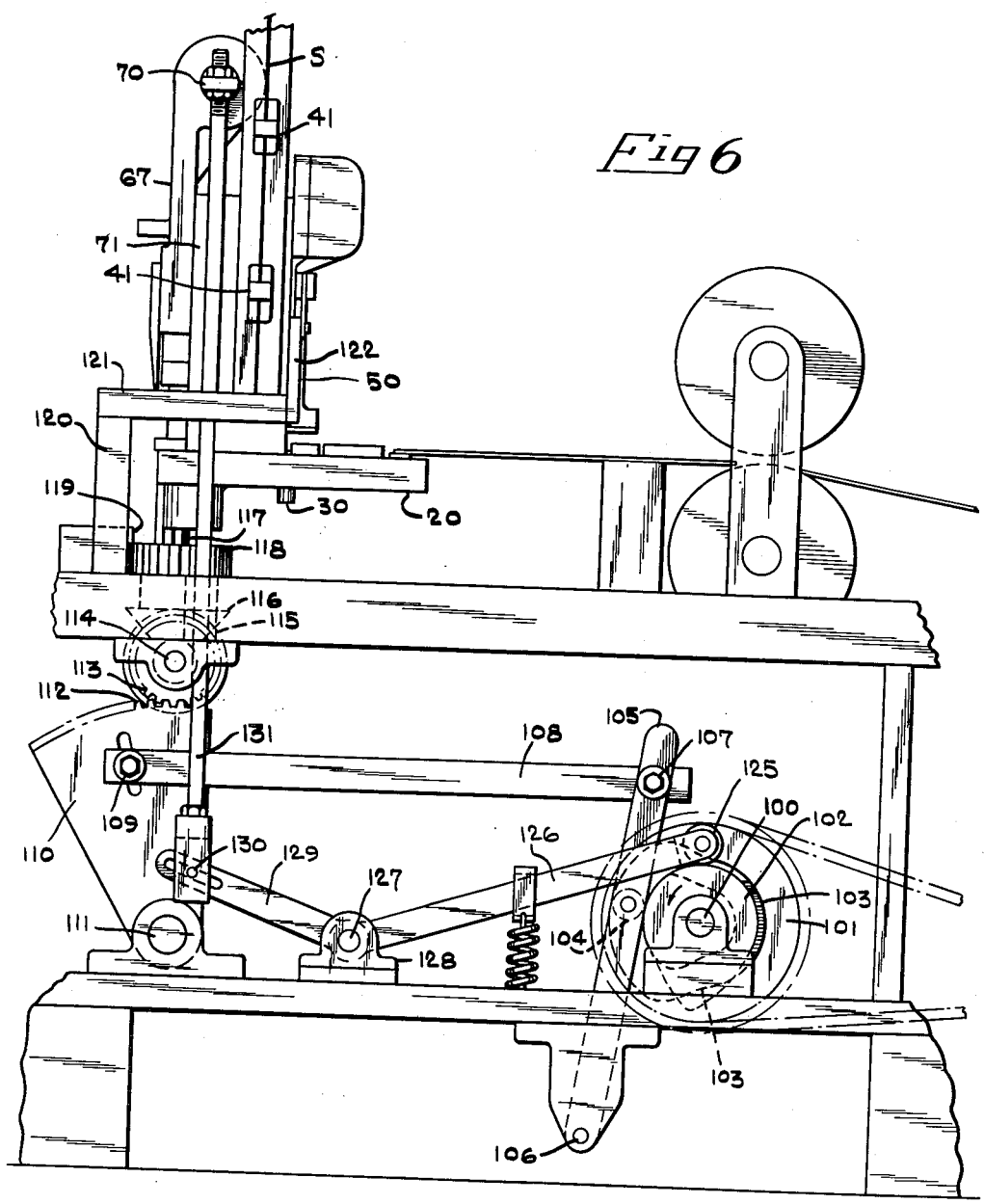

United States Patent Office 2,706,934
Patented Apr. 26, 1955

2,706,934

TEAR STRING APPLYING MEANS

Eric B. Svenson, Pompton Plains, N. J., assignor to Joseph Dixon Crucible Company, Jersey City, N. J., a corporation of New Jersey Application March 30, 1954, Serial No. 419,758

5 Claims. (Cl. 93—1)

This invention relates to paper pencils in which the paper is wound around the pencil lead and has a series of alined holes in the outer convolution. To expose successive lengths of lead the paper is slit between successive holes.

In certain pencils of this type, a tear string is placed beneath the outer convolution or convolutions and the string is pulled to tear the paper between successive holes.

This invention has for its salient object to provide a simple, practical, and efficient method of and mechanism for applying the tear string to the sheet of paper before the sheet is wound around the pencil lead or core.

Further objects of the invention will appear from the following specification taken in connection with the drawings which form a part of this application, and in which Fig. 1 is a front elevation, partly in section, of a machine embodying the invention, this view being taken on line 1—1 of Fig. 2, looking in the direction of the arrows;

Fig. 2 is a vertical sectional elevation taken substantially on line 2—2 of Fig. 1, looking in the direction of the arrows;

Fig. 3 is a front elevational view similar to Fig. 1 but showing the string depressing plungers and associated parts in section;

Fig. 6 is an elevational view of the driving and operating connections for the string feed and plunger mechanism and associated parts;

Fig. 7 is a plan view of the paper supporting plate which is disposed beneath the plungers and supports the spring actuated pins which coact with the plungers to clamp the string;

Figure 4:
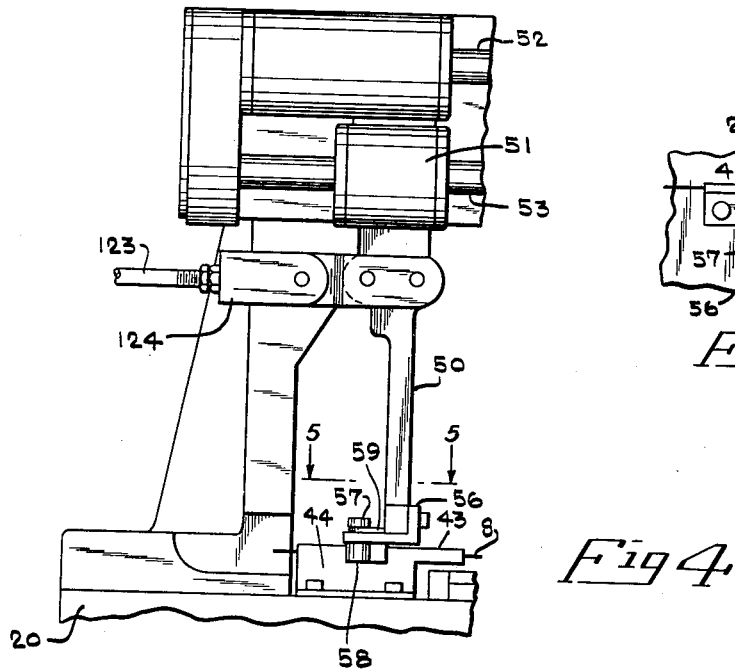
Fig. 4 is a fragmentary elevation of the string carrier for feeding the string across the paper sheet.

In the particular embodiment of the invention illustrated, there is shown a main frame support or table 20 across which the paper strip 21 is fed from a suitable supply roll (not shown).

As the paper is fed intermittently through the machine, holes H are punched and a core of crayon or pencil lead is inserted in the folded front edge thereof. The punching of the holes and insertion of the lead forms no part of the present invention and will not be described.

The invention here involved relates to the application of a tear string to the paper. This is accomplished in the manner hereinafter described by feeding the string across and above the paper strip and then pushing the string downwardly and forcing the end portions of the string beyond the strip edge downwardly, causing the string to tear slits inwardly from the paper edge. The string is then cut, leaving its ends in the slits. The mechanism by which this is accomplished will now be described.

The frame table support 20 has bolted thereto below the path of travel of the paper strip 21, a plate 25 having adjacent its ends holes 26 and 27. Each of these holes has slots 28 and 29 communicating therewith, the purpose of which will be hereinafter explained.

Below each hole and extending through the support 20 is mounted a stud 30 having a central bore extending therethrough. The lower end 31 of the bore houses a spring 32, held in the bore by a threaded plug 33. At its upper end the spring 23 bears against a head 34 of a pin 35 mounted in a sleeve 36, and attention is called to the fact that left hand portion 37 of the sleeve at the left in Fig. 3 extends upwardly beyond the right hand portion. The portion 37, in conjunction with the plunger 40 disposed thereabove, acts as a knife to cut the tear string as the plunger 40 is depressed, as hereinafter described.

Before describing the plungers for depressing the string, the means for feeding the tear string above and across the paper strip will be described.

*String feed*

The string feed is shown particularly in Figs. 1, 3, 4 and 5.

The string S is led from a supply reel R through suitable guides and is brought downwardly through guides 41 and laterally through a guide or opening 42 to a tube 43 carried by a bracket 44 mounted on support 20.

The string feed carrier is mounted at the lower end of an arm 50, which is carried by and extends downwardly from a block 51 slidably mounted on a pair of fixed rods 52 and 53 mounted on a frame member 54.

At its lower end arm 50 has mounted thereon an L-shaped or angular member having a flanged end 55 which extends over and downwardly alongside the string tube.

Figure 5:
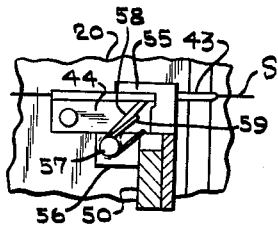
Fig. 5 is a sectional elevation taken substantially on line 5—5 of Fig. 4, looking in the direction of the arrows.

Arm 50 has also secured to its lower end a bracket 56 having a stud 57 on which is pivoted a finger 58 which is actuated in an anti-clockwise direction, viewing Fig. 5, by a spring 59. As the arm 50 is actuated to the left, viewing Figs. 1, 3 and 5, the finger 58 slides along the tube 43 and the flanged end 55 moves outside the tube. However, when the arm 50 moves to the right, the finger 58 rides off the tube 43 and pinches or clamps the string end between the finger 58 and flanged end 55 and carries the string across and above the paper strip 21.

The driving connections for reciprocating the block 51 and arm 50 will be later described.

*String depressing mechanism*

This mechanism is illustrated particularly in Figs. 1, 2 and 3.

The string is pushed down by plungers 40 and 60 carried by a transverse bar or member 61 and slidable through fixed guide blocks 62 and 63.

The bar 61 is bolted at 64 and 65 to a flange 66 on a plate 67 supported at its upper end on a transverse rod 70. The plate 67 is mounted in guides 71 and 72 carried by the machine frame.

The plate 67 has secured to the rear surface thereof a knife blade 75 which severs the paper strip 21 as the plate is pulled downwardly in a manner to be described.

Figure 8:
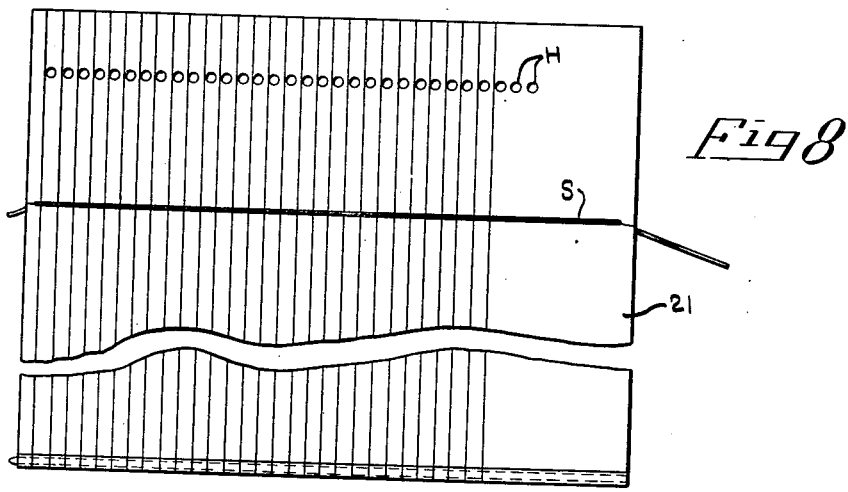
Fig. 8 is a plan view of a portion of the paper sheet.
Figure 9:
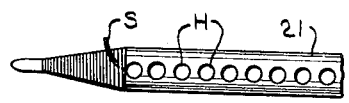
Fig. 9 is an elevational view of a portion of the pencil made by the machine.

On the bottom of flange 66 is mounted a bar 76 which has mounted therein a series of pins 77 which extend downwardly and punch holes H in the paper strip (see Fig. 8).

A clamping plate or bar 78 is mounted on the lower ends of posts 79 encircled by springs 80. The posts and plate 78 resiliently clamp the paper strip and the plate also strips the strip from the pins 77.

As the plate 67 is depressed, the bar 61 and plungers 40 and 60 engage the string and clamp the string between the plungers and the coacting spring biased pins 35. The string is forced downwardly through the edges of the paper strip and the portion 37 of sleeve 36 cuts the string. The cut end is held in a slit 85 in a rubber strip 86 into which the string is forced downwardly into the dished upper end 87 of the stud 30.

The string length will thus be positioned across the paper strip with the ends disposed in and projecting through the slits formed in the strip edges, the string ends being held by the clamping action of plungers 40 and 60 and pins 35. As the plate 67 is raised, the ends of the string are released. The advance end of the string is ejected from the clamping action of finger 58 and the flange 55 by a blade 88 mounted on a part carried by the bar 61, as shown in Fig. 3. The blade 88 moves down between the finger 58 and flange 55.

Operating connections

Fig. 6 illustrates the driving connections for operating the string carrier or feed and the plunger mechanism.

Shaft 100 is driven from any suitable source of power and has mounted thereon cams 101 and 102. Cam 101 has a cam groove 103 in which is positioned a roller 104 mounted on a lever 105 pivoted on a fixed pivot 106. The other end of lever 105 is pivoted at 107 to a link 108, which is pivoted at 109 to a segment 110 mounted on a fixed pivot 111. Segment 110 has gear teeth 112 which mesh with a gear 113 mounted on a spindle 114, on which is mounted a bevel gear 115. Gear 115 meshes with a bevel gear 116 mounted on a spindle 117 which carries a spur gear 118 which meshes with a rack 119 mounted on an arm or post 120, to the upper end of which is secured an arm or member 121 which is connected at its other end to a vertically extending arm 122. To the upper end of arm 122 is connected a rod 123 which is connected by a yoke 124 to the block 51.

Cam 102 is engaged by a roller 125 mounted on one end of an arm 126 mounted on a spindle 127 mounted in fixed brackets 128.

Spindle 127 has also mounted thereon a pair of arms 129 which are connected by a pin and slot connection 130 to vertically extending posts 131 and 132. The upper ends of posts 131 and 132 are connected to the outer ends of rod 70.

Thus, as cam 101 rotates, the string feed carriage will carry the string across and above the paper strip 21, and as cam 102 rotates, the plate 67 and plungers 40 and 60 will depress the string and leave the string ends disposed in the slits at the edges of the paper.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In combination, means for clamping a paper strip, means for feeding a length of a flexible tear string across the paper strip, and means for forcing the portion of the string beyond the edges of the strip downwardly through the outer edges of the strip, causing the string to tear slits in the edges of the paper.

2. In combination, means for clamping a paper strip, means for feeding a length of a flexible tear string across the paper strip, and reciprocatable plungers for forcing the portions of the string beyond the edges of the strip downwardly through the outer edges of the strip, causing the string to tear slits in the edges of the paper.

3. In combination, means for clamping a paper strip, means for feeding a length of a flexible tear string across the paper strip, and means including clamping means for forcing the portions of the string beyond the edges of the strip downwardly through the outer edges of the strip, causing the string to tear slits in the edges of the paper.

4. The method of applying a tear string across a strip of paper which consists of feeding a length of flexible tear string across the paper strip, clamping the strip, forcing the portions of the string beyond the lateral edges of the strip through the outer edge portions of the strip, thus tearing slits in said strip edges and holding the string ends.

5. The method of applying a tear string across a strip of paper which consists of feeding a length of flexible tear strings across the paper strip, clamping the strip, clamping and forcing the portions of the string beyond the lateral edges of the strip through the outer edge portions of the strip, thus tearing slits in said strip edges and holding the string ends.

References Cited in the file of this patent

UNITED STATES PATENTS

| | | |
|---|---|---|
| 503,500 | Simmons | Aug. 15, 1893 |
| 1,724,224 | Schroeder | Aug. 13, 1929 |
| 1,949,273 | Greenlaw | Feb. 27, 1934 |
| 2,126,922 | Robinson | Aug. 16, 1938 |
| 2,272,407 | Heckman | Feb. 10, 1942 |
| 2,553,877 | Smith et al. | May 22, 1951 |
| 2,661,582 | Hanser | Dec. 8, 1953 |